United States Patent [19]

Assmann et al.

[11] 4,155,156

[45] May 22, 1979

[54] METHOD FOR MANUFACTURING SOLID ELECTROLYTIC CAPACITORS

[75] Inventors: Erich Assmann; Ulrich Oexle, both of Heidenheim, Fed. Rep. of Germany

[73] Assignee: Siemens Aktiengesellschaft, Berlin & Munich, Fed. Rep. of Germany

[21] Appl. No.: 886,956

[22] Filed: Mar. 15, 1978

[30] Foreign Application Priority Data

Sep. 9, 1977 [DE] Fed. Rep. of Germany ....... 2740745

[51] Int. Cl.² .......................................... H01R 43/02
[52] U.S. Cl. ....................... 29/628; 29/570; 228/159; 228/179; 228/173 E
[58] Field of Search ................. 29/628, 570; 228/159, 228/170, 179, 173 E, 904; 339/75 R; 361/433

[56] References Cited

U.S. PATENT DOCUMENTS

| | | | |
|---|---|---|---|
| 2,393,966 | 2/1946 | Brennan | 361/433 X |
| 2,846,624 | 8/1958 | Hilton | 361/433 |
| 3,114,087 | 12/1963 | Stamets | 361/433 |
| 3,141,118 | 7/1964 | Runtz | 361/433 |
| 3,261,902 | 7/1966 | Pearce et al. | 361/433 X |
| 3,277,350 | 10/1966 | Pearce et al. | 361/433 |
| 3,292,233 | 12/1966 | Black, Jr. et al. | 228/179 X |
| 3,612,957 | 10/1971 | Steigerwald | 29/570 X |

FOREIGN PATENT DOCUMENTS

| | | | |
|---|---|---|---|
| 618581 | 4/1961 | Canada | 361/433 |
| 481583 | 3/1937 | United Kingdom | 361/433 |
| 725080 | 3/1955 | United Kingdom | 361/433 |
| 823193 | 11/1959 | United Kingdom | 361/433 |

*Primary Examiner*—C. W. Lanham
*Assistant Examiner*—C. J. Arbes
*Attorney, Agent, or Firm*—Hill, Gross, Simpson, Van Santen, Steadman, Chiara & Simpson

[57] ABSTRACT

A process is disclosed for the manufacture of solid electrolytic capacitors wherein sintered anode elements with their anode wires are attached to a clamping fixture. In a further step a notch is formed in the anode wires. After bending of the anode wires the anode input wires which are held in an additional fixture are welded on in overlapping fashion. The notch acts as a designed fracturing or breaking point for the final separation of the capacitor elements. It is expedient to design the anode input wires to have a section expanded to form a roof like shovel.

5 Claims, 4 Drawing Figures

METHOD FOR MANUFACTURING SOLID ELECTROLYTIC CAPACITORS

BACKGROUND OF THE INVENTION

This invention covers a process for the manufacture of solid electrolytic capacitors whereby a sintered anode body connected with an anode wire by means of clamping fixtures.

Solid electrolytic capacitors consist of a sintered element of a rectifying metal (valve-metal) as represented, for example, by tantalum, niobium, aluminum or zirconium onto which, by means of an electrochemical process, a dielectrically active oxide layer is formed. A semiconducting oxide as represented, for example, by manganese or lead oxide is, used generally in the case of solid electrolytic capacitors for the cathode. A graphite layer covered by a conductive silver laquer layer is used, for example, in contacting the cathode. These solid electrolytic capacitors are equipped with suitable housings such as metallic cups or plastic encapsulations.

In the known process of manufacturing the sintered element, the anode is connected to the anode wire, which is generally made from the same material as the anode, by means of a clamping fixture. After the processes of preforming, pyrolysis, (in order to generate the semiconducting oxide layer by pyrolytic decomposition of, for example, manganese nitrate) and coating, the anodes are individually separated from the clamping fixture. As the next step a solderable anode input wire, for example, made from nickel, is attached by welding to the anode contact. For this purpose the sintered element has to be individually refixtured in magazines or similar holders in order to bring the elements manually or automatically into position for welding.

SUMMARY OF THE INVENTION

An object of this invention is to demonstrate a process to manufacture solid electrolytic capacitors which is time saving, which can be automated, and wherein a position of the capacitor element is maintained during the entire manufacturing process.

The objective is achieved in this invention by: introducing a notch in the anode wire and by bending the anode wire in the area of the notch by an angle of $\alpha$-degrees against the holding fixture; by use of a second holding fixture to weld the anode input wires at an overlap onto the anode wire; and finally by breaking off the parts of the anode wires that are extending over the weld area at the notch introduced specifically for this purpose.

DESCRIPTION OF THE PREFERRED EMBODIMENTS

Figure 1:
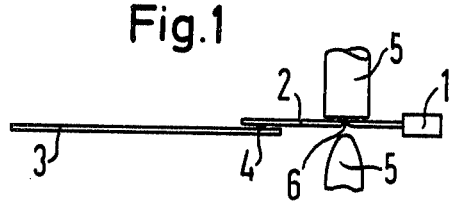
FIG. 1 illustrates the notch in the anode wire by a side view.

In FIG. 1 a sintered anode element is shown which is attached to its anode wire 2 by means of a clamping or holding fixture 3, for example by spot welding at point 4. The clamping fixture 3 is dimensioned in such a way as to hold a large number of anode elements 1 and anode wires 2. (For example 50 or 100 units). The attachment of the individual anode elements 1 to the clamping or holding fixture 3 is done in such a fashion so as to maintain a predetermined fixed distance between the individual anode wires 2.

In the presently known manufacturing processes, the anode elements 1—as was already explained in the text—stay in the holding fixture only for the processes of forming, pyrolysis and coating and are thereafter broken into single units. In this invention, however, a notch 6 is formed in the anode wires 2 between the point of attachment 4 and the sinter element 1 by using a proper tool 5. The position of the notch 6 is selected such that the notch area will be within the confines of the later attached housing.

Figure 2:
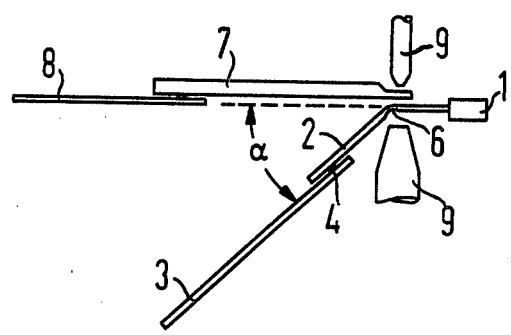
FIG. 2 illustrates in side view the welding of the anode input wire.

In FIG. 2 an additional manufacturing step is illustrated. First the anode wires 2 are bent in the area of the notch 6 by an angle $\alpha$ (example 45°). Furthermore the solderable anode input wires 7 which are attached to a second clamping fixture 8 are transferred and, by overlapping, are welded to the anode wire 2 in the area of the notch 6 using the electrodes 9 of the welder.

The anode input wires 7 are arranged in equal number and at an equal distance in the clamping fixture 8 as are the anode wires 2 in the clamping fixture 3. The attachment of the anode input or connection wires 7 onto the anode wire 2 is preferably done by roll welding.

Figure 3:
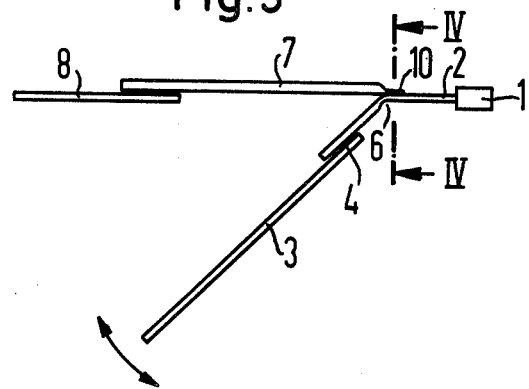
FIG. 3 illustrates the break-off of the extending anode wires.

In FIG. 3 it is shown how to accomplish the breaking off of the overhanging parts of the anode wire 2 which extend over the weld area 10 at the notch area specifically introduced for this purpose, by bending the holding fixture 3 to and fro in the direction of the arrows. The anode elements 1 are now attached by means of the anode input wires 7 to the clamping fixture 8.

Figure 4:
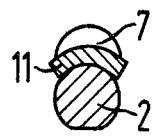
FIG. 4 illustrates a cross-sectional view of an anode input wire having a section expanded to form a roof-like shovel.

Due to the fact that the anode input wires 7 are arranged in equal numbers and in equal spaces in the clamping fixture 8 as are the anode wires 2 in the clamping fixture 3, the position of the anode element 1 has therefore stayed the same. FIG. 4 shows an enlarged drawing of a cross section of FIG. 3 along the plane IV—IV cutting through a welded area after the parts of the anode wires extending past the weld area were broken off. In this drawing it can be seen that the anode input wire 7 has been extended at its end to form a roof like (semicircular) shovel 11. This feature allows an easy centering of the anode wire 2 during the welding process and prevents a moving of the wire to the side. This could not be accomplished using the known welding procedures which are only performing a planar squeeze off in the anode input wire.

The process in accordance with this invention is indicated further by the fact that it is expedient and can be automated because the position of the anode element 1 is fixed and is not changed during the entire manufacturing process and that the break up of the capacitors into single units is accomplished in the last manufacturing step.

Although various minor modifications may be suggested by those versed in the art, it should be understood that I wish to embody within the scope of the patent warranted hereon, all such embodiments as reasonably and properly come within the scope of my contribution to the art.

We claim:

1. A process for the manufacture of solid electrolytic capacitors in which sintered anode elements of the capacitors have anode wires connected thereto and the anode wires are connected with anode input wires mounted to a second holding fixture, comprising the steps of:

provinding the anode wires with a notch at a point intended as a break off point;

providing a first holding fixture connected to outer ends of the anode wires;

bending the anode wires at the notches by a predetermined angle by use of the first holding fixture;

overlapping and welding ends of the anode input wires with the anode wires adjacent the notches; and breaking off outer portions of the anode wires at the notches.

2. A process in accordance with claim 1 including the step of providing the anode input wires with a roof like section formed as a shovel like end section.

3. A process in accordance with claim 1 including the step of joining the anode wires and the anode input wires with each other by roll welding.

4. A process in accordance with claim 1 including the step of breaking off the anode wires by moving the first holding fixture back and forth.

5. A process for the manufacture of solid electrolytic capacitor in which an anode element of the capacitor has an anode wire connected thereto which is to be connected to an anode input wire, comprising the steps of:

providing the anode wire with a notch at a point intended as a break off point;

providing a holding fixture connected to an outer end of the anode wire to be removed;

bending the anode wire at the notch by a predetermined angle by use of the holding fixture;

overlapping and welding an end of the anode input wire with a portion of the anode wire adjacent the notch between the notch and the anode element; and bending the outer end of the anode wire so as to break off the outer end at the notch.

* * * * *